Nov. 3, 1931.   D. D. PEEBLES   1,830,174
DESICCATING APPARATUS AND METHOD
Filed Jan. 31, 1927
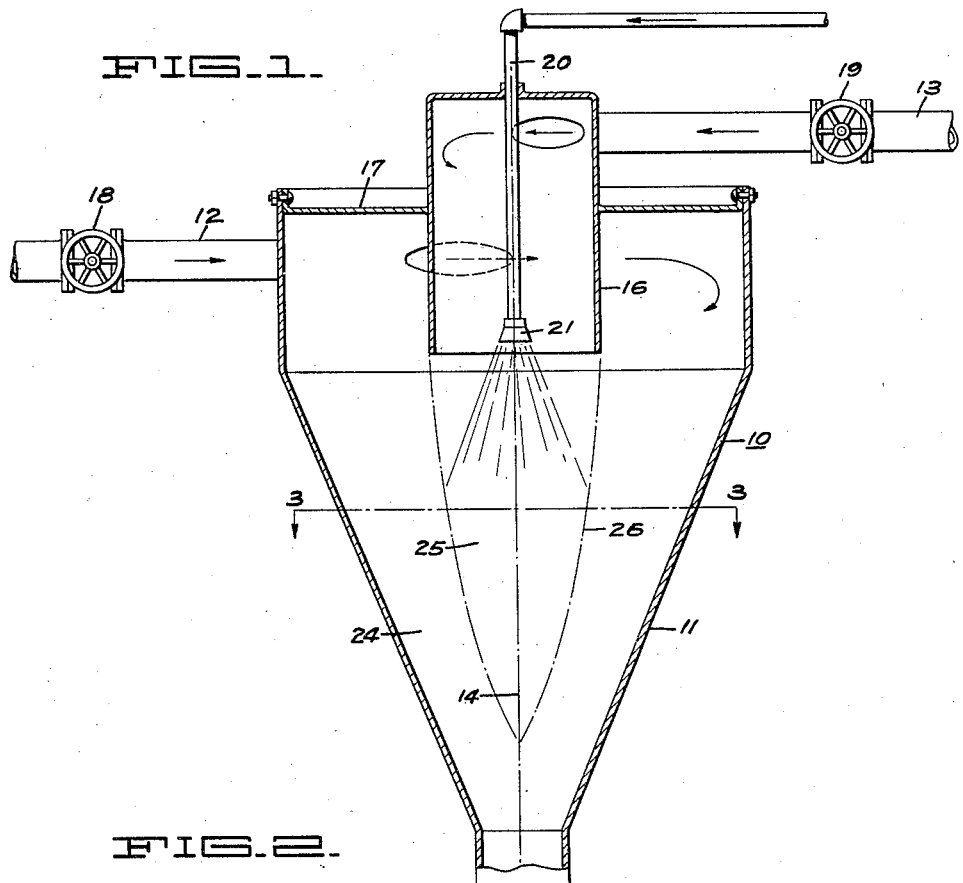
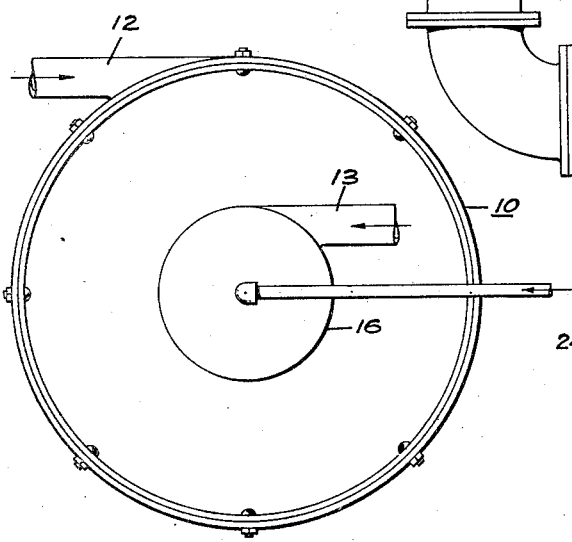
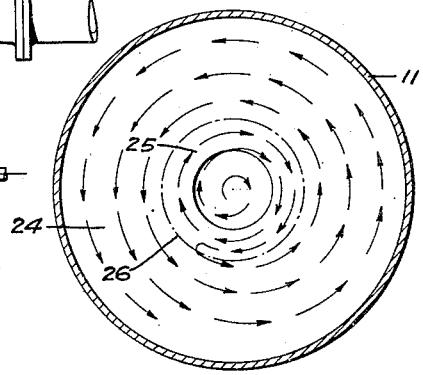
INVENTOR
David D. Peebles
BY White, Prost & Fryer
his ATTORNEYS Patented Nov. 3, 1931

1,830,174

UNITED STATES PATENT OFFICE

DAVID D. PEEBLES, OF EUREKA, CALIFORNIA

DESICCATING APPARATUS AND METHOD

Application filed January 31, 1927. Serial No. 164,991.

This invention relates generally to apparatus and methods for treating material with a gas having particular application for the desiccation of substances.

In many manufacturing processes it is necessary to remove certain vaporizable constituents of a substance, either for the purpose of securing a higher concentration or in order to reduce the substance to dried condition. One manner in which this has been accomplished has been to spray the material into a swirling current or vortex of hot air or other gas. For example, the gas is introduced tangentially into a conical shaped chamber to create a vortex into which the material is sprayed. The particles are caught up by the air and caused to take a spiral path while the vapor of the volatile constituents is being evolved. Centrifugal force finally throws the particles toward the side of the chamber and they are removed from the bottom of the cone, while the vapor ladened air is either removed with the desiccated product or separately removed from the upper portion of the chamber.

The principal factors determining the efficiency with which a substance is desiccated are its temperature, the length of time it is in suspension, the rate with which the vapors being evolved are swept away, and the humidity of the gas or other drying medium. There are certain practical limits to the temperature which can be used when desiccating organic substances such as food stuffs, as too high a temperature may cause burning. By introducing the material into a swirling current or vortex of a drying gas it has been attempted to utilize these factors to desiccate a relatively large amount of material within a chamber of limited size. Thus when passing through a vortex a particle is kept in suspension for a considerable period because of its spiral movement. Vapors evolved from a particle form an envelope of saturated gas about a particle, which if not removed will decrease the rate of evaporation. These vapors are supposedly swept away by relative movement between the particle and the surrounding gas as the gas accelerates the particle. Actually however in such a desiccator the vapors are effectively removed only while a particle is being initially caught up by the gas, after which the particle moves with the gas until removed from the chamber. With respect to temperature and humidity, an ideal desiccator would be one which would first subject the particles to a high temperature and then to a lower temperature of saturated gas during the last stages of desiccation, in order to prevent burning. With a single vortex however, the outer portion is at practically the same temperature as the inner.

The above theoretical defects are borne out in practice since desiccators employing a single gaseous vortex must use an abnormally large chamber which not only occupies a large amount of space, but is expensive to install. The temperature gradient between gas intake and outlet is not great and the gas as it leaves the chamber has a low humidity, thus showing that the apparatus is inefficient. Furthermore, in desiccating organic substances such as milk, the product is frequently burned, probably due to sticking of partially dried particles upon the chamber walls.

It is an object of this invention to devise a desiccating apparatus which will have a high operating efficiency and which will permit the use of a small chamber.

It is another object of this invention to devise a method of desiccating substances which will utilize vortical movement but which will cause particles being desiccated to traverse oppositely moving currents of gas.

It is another object of this invention to devise a method of desiccating substances which will cause the material being desiccated to traverse a number of distinct temperature zones.

Further objects of this invention will appear from the following description in which I have set forth the preferred embodiments thereof. It is to be understood that the invention is to be accorded a range of equivalents consistent with the state of the prior art.

Referring to the drawings:

Figure 1 is a side elevational view in cross section showing a desiccator incorporating the principles of this invention.

Fig. 2 is a top plan view of the desiccator shown in Fig. 1.

Fig. 3 is a cross sectional view taken along the line 3—3 of Fig. 1.

The invention consists generally in forming a compound vortical movement of gas within a desiccating chamber. By compound vortical movement I have reference to oppositely swirling nested vortexes or cyclonic movement of gas. The material to be desiccated is introduced into the chamber so that it is caused to pass successively through a plurality of such vortexes before its final removal from the chamber. Thus a particle caught up and moved in a spiral path by an inner vortex is caused to reverse its direction of movement when it progresses into an outer vortex. As an added feature to the invention it is also proposed to employ a plurality of vortexes for the purpose of maintaining distinct temperature zones through which material passes progressively.

Thus referring to the specific embodiment of the invention illustrated in the drawings, there is shown a chamber 10, which is preferably constructed with an inverted conical section 11 in order to facilitate the formation of vortical movements of gas. While moving mechanical parts may be incorporated within the chamber for imparting motion to the gas, I prefer to make use of the kinetic energy of gas introduced into the chamber for this purpose. The gas is introduced into the upper portion of the chamber through pipes 12 and 13, the point of admission of these pipes being located at different radial distances from the central axis 14 of the chamber and also being arranged to discharge into the chamber in opposite tangential directions. Thus the pipe 12 has been shown as discharging tangentially adjacent the periphery of the chamber, while pipe 13, instead of discharging directly into the chamber, is oppositely directed into a casing 16 which extends through the top portion 17 of the chamber. The lower end of this casing is open to provide unrestricted communication with the interior of the chamber. The amount of air introduced through pipes 12 and 13 may be controlled by suitable means such as valves 18 and 19. For introducing the material to be desiccated to the chamber there is provided a pipe 20 provided with a suitable spray nozzle 21, this pipe for convenience being shown as extending down through the casing 16. While the particular location of this pipe is not important, in general the nozzle 21 is preferably adjacent the center of the chamber and near the upper portion thereof. For removing the desiccated products together with the gas from the chamber there is provided a pipe 22 which communicates with the small end of the conical section 11.

When operating the apparatus for desiccating substances heated gas, such as air, is introduced through both pipes 12 and 13 and the material to be desiccated is introduced through pipe 20. Gas entering from pipe 12 tends to cause swirling of gas within the chamber in one direction while gas introduced through pipe 13 tends to cause swirling of gas in the opposite direction. The result is that there is formed what may be termed a compound vortical movement of gas within the chamber. In other words, there is formed an outer zone 24 formed by a vortex as a result of the introduction of the gas through pipe 12 and an inner vortex 25 formed as a result of gas introduced through pipe 13. This effect is made possible because of the compressibility of gas which causes a high pressure region or layer 26 to be formed between the two vortexes. The relative extent of the vortexes may be controlled by varying the amounts of gas admitted through each pipe, as by manipulation of valves 18 and 19. As a particle of substance leaves the nozzle 21 it is first caught up and accelerated by the inner vortex 25 and because of centrifugal force, is thrown outwardly in a spiral path. As it reaches the dividing layer 26 its velocity is arrested since the gas in this layer does not rotate about the center of the chamber but is in a state of local turbulence. Therefore the particle will remain in this layer for a considerable period, after which it will gradually progress into the outer vortex 24. Here the particle will again be accelerated and thrown towards the sides of the chamber until withdrawn through pipe 22. In the cross section shown in Fig. 3 an imaginary path of a particle has been shown by the arrows in order to indicate how the particle is first moved about the center of the chamber in one direction and then has its movement reversed when passing into the next vortex.

It will be obvious from the above description that conditions within the chamber are favorable for efficient removal of the vaporizable constituents of a substance. The vapors being evolved are effectively swept away as each particle is not only initially accelerated but is subsequently decelerated and again accelerated in the opposite direction. The particles are kept in suspension in the gas for a relatively long period before they are permitted to contact with the side walls of the chamber, since they are not immediately thrown outwardly by centrifugal force as in the case of the ordinary single vortex desiccator. As the kinetic energy imparted to the particles by an inner vortex must be dissipated when the particles progress to an outer vortex rotating in the opposite direction, the particles tend to remain near the outer part of an inner vortex until they lose their kinetic energy and then they are picked up by the outer vortex. This action tends to crowd the particles together or to concentrate them adjacent the dividing layer between two vortexes.

Although good results may ordinarily be obtained by introducing gas at approximately the same temperature in different parts of the chamber, in order to secure best results when desiccating organic substances, it is proposed to provide separate zones of different temperature within the chamber through which the substance must pass progressively. These zones are produced by introducing the gas into the pipes at different temperatures. Since a higher temperature may be employed during the first stages of a desiccating process without injury to an organic substance, the gas introduced to form the inner vortexes is heated to a higher temperature than the gas introduced for the outer vortexes. Thus in the modification of the invention which I have illustrated in which only two vortexes are employed, gas is introduced into pipe 13 at a relatively higher temperature than gas introduced through pipe 12. The material introduced into the inner vortex will therefore be subject to a much higher temperature than that to which it is subjected after passing into the outer vortex. This process is especially useful when desiccating substances such as milk which when relatively dry, may be readily burned by a gas temperature which would cause no injury during the first stages of the desiccating process. The outer zone in this case serves in effect to blanket the side walls of the chamber and thus prevents these side walls from being excessively heated by the gas of the higher temperature inner zone.

In practice it has been found that the apparatus operates with a large temperature gradient, that is, there is a large temperature drop between the temperature of the gas introduced into the chamber and the temperature of the gas when withdrawn. Furthermore, the humidity of the gas leaving the chamber may be made greater than 50% saturation as compared to about 5% saturation obtained with desiccating apparatus employing a single vortex, thus showing that a maximum quantity of material is being desiccated with a given quantity of gas. An apparatus having two vortexes formed within a chamber about 6 feet in diameter has a desiccating capacity about equal to a single vortex apparatus having a chamber about 30 feet in diameter, and in addition is far more efficient in operation.

I claim:

1. In a desiccating apparatus, a chamber, means for producing a compound vortical movement of drying gas in said chamber, and means for causing material to be treated to pass progressively from the inner to the outer vortex.

2. In a desiccating apparatus, a chamber, means for introducing gas into said chamber into two nested zones and in different tangential direction for each zone to form two nested vortexes of gas within the chamber, and means for introducing material to be treated into the inner of said zones.

3. In a desiccating apparatus, a chamber through which drying gas is continuously passed, means for producing a series of nested vortexes of gas within said chamber, and means for introducing material to be treated into the inner of said vortexes.

4. An apparatus of the class described comprising a chamber, the chamber having a central axis, means for introducing gas into said chamber in opposite tangential directions and at points spaced different radial distances from said central axis, thereby producing a series of nested vortexes, and means for introducing material to be treated into the inner of said vortexes.

5. A desiccator comprising a chamber through which drying gas is continuously passed, means for forming oppositely swirling nested vortexes within the chamber, and means for introducing material into the inner one of said vortexes.

6. A desiccator for material capable of being suspended in gas currents comprising a chamber through which drying gas is continuously passed, means for imparting a compound vortical movement to gas within the chamber, and means for introducing said material to be desiccated into the inner vortex of said movement.

7. The method of desiccating substances comprising introducing the same into the inner vortex of a plurality of oppositely directed nested vortexes of drying gas.

8. The method of desiccating substances comprising introducing the same into the inner of a plurality of oppositely directed nested vortexes of drying gas, the innermost vortex being at a higher temperature than the outer.

9. In an apparatus for treating material capable of being held in suspension in a gaseous medium comprising a chamber thru which gas is continuously introduced into the upper portion thereof and removed from the lower portion thereof, means for effecting a compound vortical movement of gas within the chamber to form a plurality of oppositely directed nested vortexes, and means for introducing said material into the inner of said vortexes.

10. The method of desiccating substances comprising spraying the same into the inner vortex of a plurality of oppositely directed nested vortexes of drying gas.

11. The method of treating substances comprising introducing the same into the inner vortex of a plurality of oppositely directed nested vortexes of gas and causing the material to progress into the outer vortex.

12. The method of desiccating material comprising introducing the same into a vortex of drying gas whereby the material is caught up and swirled by the gas and is caused to progress toward the outer surface of the vortex by virtue of centrifugal force, and then causing the material to progress into another oppositely directed vortex which surrounds the first vortex and which alters the direction of movement of the material.

13. The method of effecting desiccation of material within a chamber comprising causing drying gas within the chamber to swirl in opposite directions in two nested treatment zones, introducing material to be desiccated into the inner of said zones whereby it is caused to move progressively thru said zones by centrifugal force, and removing the material from said outer zone.

14. The method of effecting desiccation of material within a chamber comprising separately introducing at least two streams of drying gas into the chamber at different temperatures, causing said gas streams to move cyclonically in opposite directions in two nested treatment zones, the inner zone being formed of the gas of higher temperature, introducing material to be desiccated into the inner of said zones whereby it is caused to move progressively outwardly to the outer zone, and removing the material from said outer zone.

15. An apparatus for effecting treatment of material in moving currents of gas comprising a chamber thru which gas is continuously passed, means for causing a rapid swirling movement of gas within one zone of said chamber, means for causing a second swirling movement of gas in a second zone of said chamber surrounding the first zone, said second movement being in a direction opposite to the first mentioned movement, and means for introducing material into said first zone.

16. In a desiccating apparatus, a desiccating chamber, means for maintaining a zone of relatively high temperature drying gas within the chamber, means for maintaining a zone of relatively cooler gas within the chamber which swirls about the inner high temperature zone, and means for introducing material to be desiccated into gas forming the inner zone.

17. In a desiccating apparatus, a desiccating chamber, means for maintaining a swirling zone of high temperature drying gas within the chamber, means for maintaining a zone of swirling gas of relatively lower temperature within the chamber about the inner zone, and means for introducing material to be desiccated into the gas forming the inner zone.

18. In a desiccating apparatus, a desiccating chamber, a conduit extending into the chamber and having an inner open end generally alined with the central axis of the chamber means for introducing relatively high temperature drying gas into the chamber thru said conduit, means for introducing material to be desiccated into said gas, and means for blanketing the inner side walls of the chamber with relatively cooler gas swirling cyclonically about the axis of the chamber.

19. The method of desiccating material in an enclosed chamber thru which drying gas is continuously passed, comprising maintaining a high temperature gas zone spaced from the inner surrounding side walls of the chamber, blanketing the inner side walls of the chamber with gas at a relatively lower temperature swirling cyclonically about the inner zone, and introducing the material to be desiccated into the inner zone.

20. A method of treating material characterized by the use of a treatment chamber, said method comprising introducing the material in a zone in the interior of the chamber, said zone being formed by gas swirling about a general axis, and causing the material as it leaves said zone to be entrained in a second zone of gas swirling around within the chamber about the general axis of said first mentioned swirling zone and in an opposite direction.

21. A method of treating material characterized by the use of a treatment chamber, said method comprising introducing the material in a zone in the interior of the chamber, said zone being formed by relatively high temperature gas swirling about a general axis, and causing the material as it leaves said zone to be entrained in a second zone of relatively lower temperature gas swirling within the chamber about the general axis of said first mentioned swirling zone and in an opposite direction.

22. A method of desiccating material characterized by the use of a treatment chamber, said method comprising introducing the material to be desiccated in a zone in the interior of the chamber, said zone being formed by relatively high temperature drying gas swirling about a general axis, and causing the material as it leaves said zone to be entrained in a second zone of drying gas at a relatively lower temperature swirling around within the chamber about the general axis of said first mentioned swirling zone, the swirling movement of the gas in said second zone being in a direction opposite to the swirling movement of the gas in said first zone.

In testimony whereof, I have hereunto set my hand.

DAVID D. PEEBLES.